United States Patent
Matsumoto et al.

(10) Patent No.: US 7,562,948 B2
(45) Date of Patent: Jul. 21, 2009

(54) DECELERATION CONTROL APPARATUS AND METHOD FOR AUTOMOTIVE VEHICLE

(75) Inventors: Shinji Matsumoto, Kanagawa (JP); Tatsuya Suzuki, Kanagawa (JP); Masahide Nakamura, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 156 days.

(21) Appl. No.: 11/110,786

(22) Filed: Apr. 21, 2005

(65) Prior Publication Data

US 2005/0236895 A1    Oct. 27, 2005

(30) Foreign Application Priority Data

Apr. 23, 2004    (JP) ............... 2004-128336

(51) Int. Cl.
*B60T 8/60* (2006.01)
*G06F 7/00* (2006.01)

(52) U.S. Cl. .............. 303/146; 303/140; 303/145; 701/70

(58) Field of Classification Search .......... 303/140, 303/146, 145, 150, 191, 198, 22.1; 701/70, 701/78, 83
See application file for complete search history.

(56) References Cited

U.S. PATENT DOCUMENTS

| 5,113,345 | A | * | 5/1992 | Mine et al. ............ 701/38 |
| 5,315,295 | A | | 5/1994 | Fujii |
| 5,694,321 | A | * | 12/1997 | Eckert et al. .......... 701/91 |
| 5,899,952 | A | * | 5/1999 | Fukada ............... 701/74 |
| 6,185,497 | B1 | * | 2/2001 | Taniguchi et al. ........ 701/70 |
| 6,246,947 | B1 | * | 6/2001 | Batistic ............... 701/72 |
| 6,276,766 | B1 | * | 8/2001 | Yamada .............. 303/154 |
| 6,334,656 | B1 | * | 1/2002 | Furukawa et al. ....... 303/146 |
| 6,374,162 | B1 | * | 4/2002 | Tanaka et al. .......... 701/1 |
| 6,393,361 | B1 | * | 5/2002 | Yano et al. ........... 701/301 |
| 6,409,287 | B1 | * | 6/2002 | Leach et al. .......... 303/146 |
| 6,438,474 | B1 | * | 8/2002 | Tanaka et al. ......... 701/41 |
| 6,549,842 | B1 | | 4/2003 | Hac et al. |
| 6,659,570 | B2 | * | 12/2003 | Nakamura ........... 303/146 |
| 6,708,088 | B2 | * | 3/2004 | Matsuno et al. ........ 701/1 |
| 7,099,759 | B2 | * | 8/2006 | Ghoneim ............ 701/41 |
| 2002/0109402 | A1 | * | 8/2002 | Nakamura ........... 303/146 |

FOREIGN PATENT DOCUMENTS

JP    3133770 B2    11/2000

* cited by examiner

*Primary Examiner*—Melody M Burch
(74) *Attorney, Agent, or Firm*—Foley & Lardner LLP

(57) ABSTRACT

There is provided a deceleration control apparatus for an automotive vehicle, which has a control unit including a deceleration control block that causes deceleration of the vehicle in accordance with a traveling state of the vehicle, an estimation block that estimates a change in vehicle behavior produced by causing the vehicle deceleration, and a suppression block that controls a braking force on each vehicle wheel so as to suppress the estimated vehicle behavior change.

8 Claims, 8 Drawing Sheets

DECELERATION CONTROL APPARATUS AND METHOD FOR AUTOMOTIVE VEHICLE

BACKGROUND OF THE INVENTION

The present invention relates to a deceleration control apparatus and method for controlling deceleration of an automotive vehicle in accordance with a traveling state of the vehicle.

Various deceleration control apparatuses have been proposed for automotive vehicles to prevent understeering during a vehicle turn. One type of vehicle deceleration control apparatus is configured to determine a vehicle safety speed according to the turning state of a vehicle and, if the actual vehicle speed exceeds the determined safety speed, to automatically perform deceleration control on the vehicle in such a manner that the actual vehicle speed becomes lower than or equal to the safety speed. Japanese Patent No. 3133770 discloses another type of vehicle deceleration control apparatus that is configured to obtain information about the conditions of a curved road ahead of a vehicle from a navigation or infrastructure system and, if the vehicle speed is too high for the curved road conditions to start performing deceleration control on the vehicle before the vehicle comes into the curved road.

Vehicle collision avoidance systems have also been proposed, which perform deceleration control according to the approach of a vehicle to an obstacle in order to avoid a collision of the vehicle with the obstacle or to reduce a collision speed between the vehicle and the obstacle.

Furthermore, vehicle braking systems have been proposed to control a braking force distribution between front and rear vehicle wheels, or estimate a vehicle load shift based on vehicle longitudinal and lateral acceleration under braking and then control a braking force distribution according the estimated load shift, for stabilization of vehicle braking behavior.

SUMMARY OF THE INVENTION

The above-proposed vehicle deceleration control apparatuses are effective in preventing vehicle overspeed and improving vehicle stability so as to secure driver comfort. When these deceleration control apparatuses perform deceleration control under high lateral acceleration, however, there arises a vehicle load shift that can cause a change in vehicle behavior.

It is less likely that a vehicle behavior change will occur under the control of the above-proposed braking systems, but these braking system occasionally perform braking control (deceleration control) regardless of a driver's intention so that even a slight change in vehicle behavior leads to driver discomfort. When the radius of the curved road is too small for the vehicle speed (i.e. when the vehicle comes into the curved road at overspeed), drive's steering operation becomes so abrupt and hard that the vehicle acceleration and yaw rate suddenly change. In such a case, the vehicle behavior then becomes unstable at an earlier time. The proposed braking systems may not be able to stabilize the vehicle behavior sufficiently by estimating the vehicle load shift based on the vehicle acceleration and then controlling the braking force distribution according the estimated load shift.

It is therefore an object of the present invention to provide a deceleration control apparatus and method for controlling deceleration of an automotive vehicle without causing a change in vehicle behavior under deceleration control.

According to a first aspect of the present invention, there is provided a deceleration control apparatus for causing deceleration of an automotive vehicle in accordance with a traveling state of the vehicle, comprising a control unit programmed to estimate, prior to causing the vehicle deceleration, a change in vehicle behavior that can occur under the deceleration, and then, control a braking force on each vehicle wheel so as to suppress the vehicle behavior change.

According to a second aspect of the present invention, there is provided a deceleration control apparatus for an automotive vehicle, which comprises a control unit including: a deceleration control block that causes deceleration of the vehicle in accordance with a traveling state of the vehicle; an estimation block that estimates a change in vehicle behavior produced by causing the vehicle deceleration; and a suppression block that controls a braking force on each vehicle wheel so as to suppress the estimated vehicle behavior change.

According to a third aspect of the present invention, there is provided a deceleration control method for an automotive vehicle, comprising: causing deceleration of the vehicle in accordance with a traveling state of the vehicle; estimating a change in vehicle behavior occurring when the vehicle deceleration is caused; and controlling a braking force on each vehicle wheel so as to suppress the estimated vehicle behavior change.

The other objects and features of the invention will also become understood from the following description.

DESCRIPTION OF THE EMBODIMENTS

The present invention will be described in detail by way of the following first, second and third embodiment, in which like parts and portions are designated by like reference numerals so as to omit repeated explanations thereof.

The first embodiment will be now explained below with reference to FIGS. 1 to 4, 5A and 5B.

Figure 1:
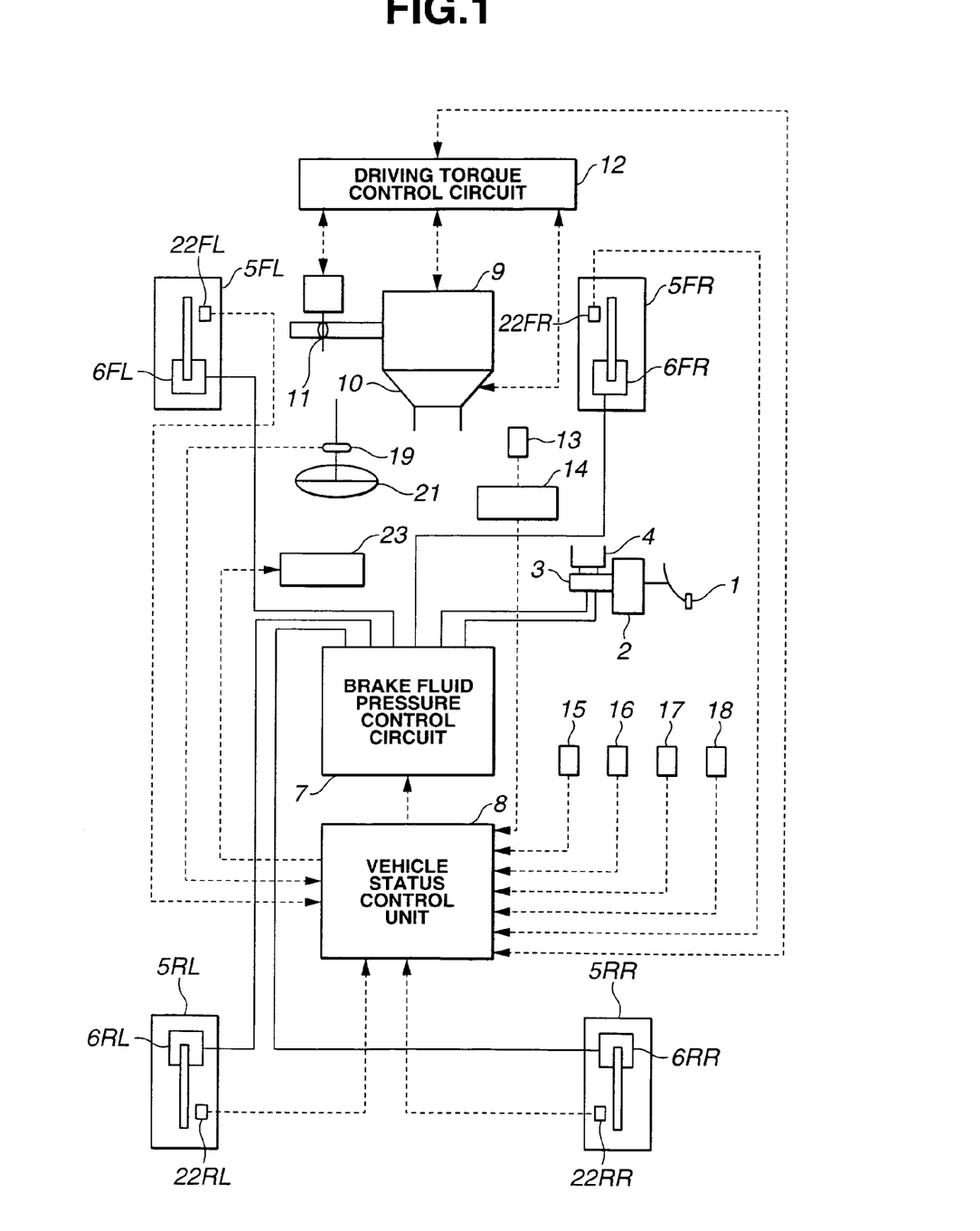
FIG. 1 is a diagram of a vehicle equipped with a deceleration control apparatus according to a first embodiment of the invention.

As shown in FIG. 1, the first embodiment refers to a rear-wheel-drive vehicle equipped with vehicle status control unit 8, a braking unit including brake pedal 1, booster 2, master cylinder 3, brake fluid reservoir 4 and brake fluid pressure control circuit 7, engine 9 with throttle 11, automatic transmission 10, a conventional differential gear and driving torque control circuit 12.

The braking unit is designed to control the braking force on each of front-left wheel 5FL, front-right wheel 5FR, rear-left wheel 5RL and rear-right wheel 5RR through brake fluid pressure regulation. Normally, a brake fluid is pressurized by master cylinder 3 in response to the depression of brake pedal 1 and fed to each of wheel cylinders 6FL, 6FR, 6RL and 6RR of vehicle wheels 5FL, 5FR, 5RL and 5RR. In the first embodiment, brake fluid pressure control circuit 7 is disposed between master cylinder 3 and wheel cylinders 6FL, 6FR, 6RL and 6RR and becomes actuated under a brake fluid pressure control command from vehicle status control unit 8 so as to regulate the brake fluid pressures supplied from master cylinder 3 to wheel cylinders 6FL, 6FR, 6RL and 6RR of vehicle wheels 5FL, 5FR, 5RL and 5RR individually. Herein, brake fluid pressure control circuit 7 may employ a circuit configuration for use in e.g. antiskid control or traction control in which the brake fluid pressures are regulated as appropriate by means of e.g. a proportional solenoid.

Driving torque control circuit 12 is designed to control the operating conditions of engine 1, such as the opening of throttle 11, fuel injection amount and ignition timing, and the gear ratio of automatic transmission 10 and thereby adjust driving torque Tw (i.e. torque applied to drive wheels 5RL and 5RR). In the first embodiment, driving torque control circuit 12 operates under its own control or becomes actuated under a driving torque control command from vehicle status control unit 8 so as to adjust the driving torque Tw through engine and/or transmission control. The driving torque Tw is signaled from driving torque control circuit 12 to vehicle status control unit 8.

The vehicle is also equipped with, as shown in FIG. 1, inter-vehicle distance sensor 13 (such as a laser radar) that detects a preceding vehicle ahead of the host vehicle, inter-vehicle distance controller 14 that judges the presence of the preceding vehicle and determines longitudinal and lateral components Lx and Ly of an inter-vehicle distance from the host vehicle to the preceding vehicle based on the detection result of inter-vehicle distance sensor 13, acceleration sensor 15 that detects an actual longitudinal acceleration Xg and an actual lateral acceleration Yg of the vehicle, yaw rate sensor 16 that detects an actual yaw rate $\phi$ of the vehicle by measurement, master cylinder pressure sensor 17 that detects a brake fluid pressure Pm produced by master cylinder 3 in response to the depression of brake pedal 1 (hereinafter just referred to as a "master cylinder pressure"), accelerator opening sensor 18 that detects an accelerator pedal depression, i.e., accelerator opening Acc, steering angle sensor 19 that detects a steering angle $\theta$ of steering wheel 21, and wheel speed sensors 22FL, 22FR, 22RL and 22RR that detect rotation speeds Vwi (i=FL, FR, RL and RR) of vehicle wheels 5FL, 5FR, 5RL and 5RR (hereinafter just referred to as "wheel speeds"), respectively. These detected vehicle parameters Lx, Ly, Xg, Yg, $\phi$, Pm, Acc, $\theta$ and Vwi are signaled to vehicle status control unit 8. It is herein defined that, when the vehicle parameter has a directional property, the sign of such a directional vehicle parameter is positive on the left and is negative on the right. In other words, either of the yaw rate $\phi$, the lateral acceleration Yg and the steering angle $\theta$ becomes a positive value during a left turn of the vehicle and becomes a negative value during a right turn of the vehicle.

The vehicle further includes warning unit 23 to give a warning to a driver at the start of deceleration control. In general, warning unit 23 has a speaker and a monitor to indicate warning information by voice (such as buzzer sounds) and by display.

Figure 2:
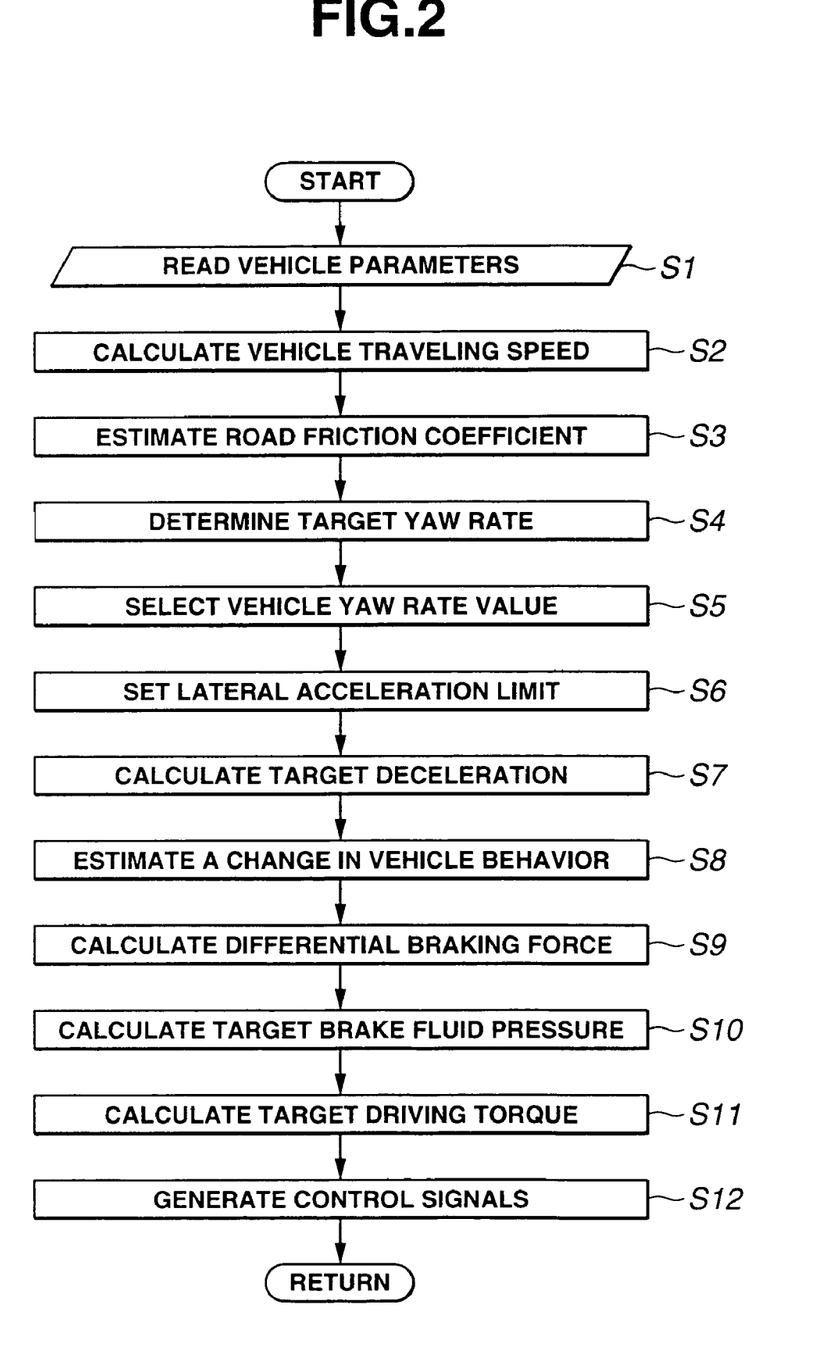
FIG. 2 is a flowchart for a control program executed by a vehicle status control unit of the deceleration control apparatus according to the first embodiment of the invention.

As shown in FIG. 2, vehicle status control unit 8 executes the following control program with timer interruptions at established sampling intervals $\Delta T$ (e.g. $\Delta T$=10 ms) in order to control an operating status of the vehicle. It should be noted that, although the flowchart of FIG. 2 does not provide a step for data communication, the data obtained by calculation processing is at any time updated and stored in an random access memory of vehicle status control unit 8, and then, the required data is read out from the random access memory.

First, vehicle status control unit 8 reads at step S1 various vehicle parameters, such as the longitudinal acceleration Xg, the lateral acceleration Yg, the actual (measured) yaw rate $\phi$, the master cylinder pressure Pm, the accelerator opening Acc, the steering angle $\theta$, the wheel speeds Vwi and the driving torque Tw, from sensors 15-19, 22FL, 22FR, 22RL and 22RR and control circuit 12.

At step S2, vehicle status control unit 8 calculates an actual traveling speed V of the vehicle (hereinafter just referred to as a "vehicle speed"). Although the calculation method of the vehicle speed V is not particularly restricted, the vehicle speed V is calculated based on an average of the wheel speeds Vwfl and Vwfr of non-drive wheels 5FL and 5FR in the first embodiment. If there is provided an antilock brake system (ABS) to perform antiskid control on the vehicle, the vehicle speed V may alternatively be taken as a vehicle traveling speed estimated during the antiskid control.

At step S3, vehicle status control unit 8 estimates a friction coefficient K$\mu$ of a road on which the vehicle is traveling by a known method. In the first embodiment, the road friction coefficient K$\mu$ is estimated based on a driving/braking force applied to each vehicle wheel 5FR, 5FR, 5RL, 5RR and a slip rate of each vehicle wheel 5FR, 5FR, 5RL, 5RR. The estimation method of the road friction coefficient K$\mu$ is not limited to the above. The road friction coefficient K$\mu$ can alternatively be estimated by any other method based on various vehicle parameters or, if there is an infrastructure system near a traveling course of the vehicle, obtained as road information from the infrastructure system before the vehicle comes into a curved road. The road fiction coefficient K$\mu$ may be given by the driver with visual observations using a selector switch. In this case, it is desirable to make broad switch settings: such as "high or dry" position (e.g. equal to 1.0 g), "middle or wet" position (e.g. equal to 0.8 g) and "low or compacting snow" position (e.g. equal to 0.4) for ease of driver's selection.

Figure 3:
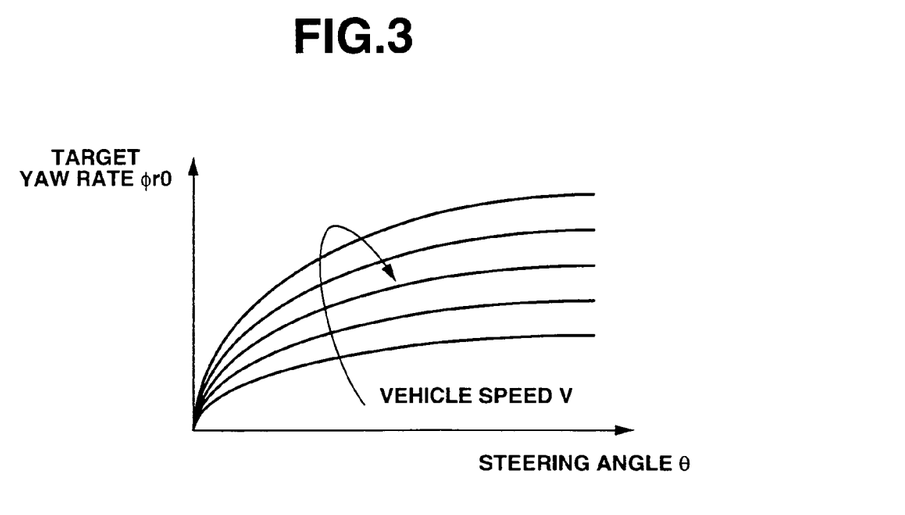
FIGS. 3 and 4 are vehicle parameter control maps used for the execution of the control program according to the first embodiment of the invention.

At step S4, vehicle status control unit 8 determines a reference target yaw rate $\phi$r0 based on the vehicle speed V and the steering angle $\theta$. In the first embodiment, vehicle status control unit 8 stores therein a target yaw rate control map of FIG. 3 defining a correlation of the target yaw rate $\phi$r0 with the vehicle speed V and the steering angle $\theta$ and retrieves the target yaw rate $\phi$r0 from the raw rate control map with reference to the current actual vehicle speed V and steering angle $\theta$. As shown in FIG. 3, the vertical and horizontal axes of the yaw rate control map represent the target yaw rate $\phi$r0 and the steering angle $\theta$, respectively. The target yaw rate $\phi$r0 increases with the steering angle $\theta$, and the rate of increase of the target yaw rate $\phi$r0 relative to the steering angle $\theta$ becomes high as the steering angle $\theta$ decreases. Further, the target yaw rate $\phi$r0 increases with the vehicle speed V up to a certain point and then decreases with increase in the vehicle speed V. The determination method of the target yaw rate $\phi$r0 is not limited to the above. The target yaw rate $\phi$r0 may alternatively be determined based on the vehicle speed V and the steering angle $\phi$ according to a vehicle behavior model.

At step S5, vehicle status control unit 8 selects the higher value of the absolutes of the actual measured yaw rate φ and the calculated target yaw rate φr0 as a yaw rate selection value φs.

At step S6, vehicle status control unit 8 sets a lateral acceleration limit Yglimit of the vehicle. In order for the driver to obtain a feeling of security without discomfort, the lateral acceleration limit Yglimit is set by the driver using a selector switch. For example, the selector switch may be initially set at "middle" position: YglimtM (e.g. equal to 0.65 g) and shifted to "low" position: YglimtL (e.g. equal to 0.45 g) or "high" position: YglimtH (e.g. equal to 0.8 g) as appropriate.

At step S7, vehicle status control unit 8 calculates a target vehicle speed Vs and a target deceleration Xgs according to the following expressions (1) and (2), respectively:

$$Vs = (K\mu \times Y\text{glimt})/\phi s \quad (1)$$

$$Xgs = (V - Vs)/\Delta T \quad (2)$$

where Kμ is the road friction coefficient estimated at step S3; φs is the yaw rate selected at step S5; Yglimt is the lateral acceleration limit set at step S6; V is the vehicle speed calculated at step S2; and ΔT is the set time for calculation of the target deceleration Xgs.

The set time ΔT is given as a fixed value in the first embodiment. Alternatively, the set time ΔT may be adjusted in response to the setting of the lateral acceleration limit Yglimt.

Herein, the starting of deceleration control is effected when the target deceleration Xgs is higher than zero (Xgs>0). Under the deceleration control, the vehicle can be decelerated by causing at least one of a decrease in engine output, a change in transmission gear ratio and an increase in brake fluid pressure. Thus, the brake fluid pressures in wheel cylinders 6FL, 6FR, 6RL and 6RR of vehicle wheels 5FL, 5FR, 5RL and 5RR and the driving torque Trq are mainly controlled for vehicle deceleration in the first embodiment.

Figure 4:
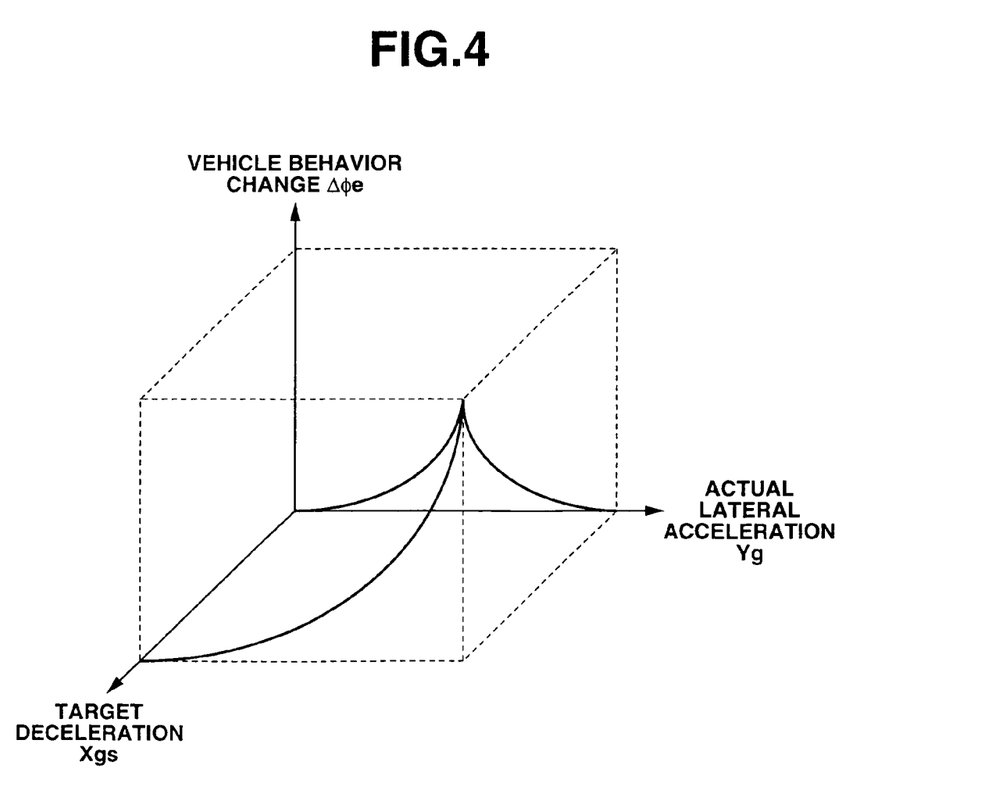

At step S8, vehicle status control unit 8 estimates a change Δφe in vehicle turning behavior that can occur under the deceleration control. In the first embodiment, vehicle status control unit 8 stores therein a vehicle behavior control map of FIG. 4 defining a correlation of the vehicle turning behavior change Δφe with the actual lateral acceleration Yg and the target deceleration Xgs and retrieves the vehicle behavior change Δφe from the vehicle behavior control map with reference to the current actual lateral acceleration Yg and the target deceleration Xgs. The vehicle behavior change Δφe depends on a load shift in the vehicle that can be caused when the vehicle is decelerated under lateral acceleration. As shown in FIG. 4, the X-, Y- and Z-axes of the vehicle behavior control map represent the lateral acceleration Yg, the target deceleration Xgs and the vehicle behavior change Δφe, respectively. The vehicle behavior change Δφe increases with the lateral acceleration Yg and increases with the target deceleration Xgs. Further, the rate of increase of the vehicle behavior change Δφe relative to either the lateral acceleration Yg or the target deceleration Xgs becomes high as the lateral acceleration Yg or the target deceleration Xgs increases. The estimation method of the vehicle behavior change Δφe is not limited to the above. The vehicle behavior change Δφe may alternatively be estimated based on a vehicle behavior model in view of the longitudinal and lateral components of the vehicle load shift and the changes in lateral tire force and vehicle speed that can be caused when the vehicle actually undergoes the target deceleration Xgs.

At step S9, vehicle status control unit 8 calculates a target differential braking force ΔPr on the vehicle, which corresponds to a braking force differential applied between left wheels 5FL, 5RL and right wheels 5FR, 5RR to suppress the estimated vehicle behavior change Δφe, according to the following expression (3):

$$\Delta Pr = Kb \times \Delta\phi e \quad (3)$$

where Δφe is the vehicle behavior change estimated at step S8; and Kb is the conversion factor for converting the vehicle behavior change into the differential braking force.

The conversion factor Kb is a constant determined according to vehicle specifications including brake specifications (such as vehicle yaw inertia and tread).

Vehicle status control unit 8 further calculates at step S9 a target differential braking force ΔPrF between front-left wheel 5FL and front-right wheel 5FR and a target differential braking force ΔPrR between rear-left wheel 5RL and rear-right wheel 5RR according to the following expressions (4A) and (4B), respectively, in view of the front-rear braking force distribution:

$$\Delta PrF = Kfr \times \Delta Pr \quad (4A); \text{ and}$$

$$\Delta PrR = (1 - Kfr) \times \Delta Pr \quad (4B)$$

where Kfr is the distribution factor for distributing the differential braking force to front wheels 5FL and 5FR.

The distribution factor Krf is a constant determined according to vehicle characteristics.

At step S10, vehicle status control unit 8 determines target brake fluid pressures Psfl, Psfr, Psrl and Psrr supplied to wheel cylinders 6FL, 6FR, 6RL and 6RR of vehicle wheels 5FL, 5FR, 5RL and 5RR, respectively, by the following procedure.

First, vehicle status control unit 8 determines a reference target brake fluid pressure Pc, which corresponds to a reference target braking force required to achieve the target deceleration Xgs, according to the following expression (5):

$$Pc = Kbl \times Xgs \quad (5)$$

where Xgs is the target deceleration calculated at step S7; and Kbl is the conversion factor for converting the target deceleration into the brake fluid pressure.

The conversion factor Kbl is a constant determined according to vehicle specifications including brake specifications.

Next, vehicle status control unit 8 determines a reference target brake fluid pressure PsF in wheel cylinders 6FL, 6FR of front wheels 5FL, 5FR and a reference target brake fluid pressure PsR in wheel cylinders 6RL, 6RR of rear wheels 5RL, 5RR according to the following expressions (6A) and (6B), respectively, in view of the master cylinder pressure Pm produced in response to driver's brake pedal operation:

$$PsF = \max(Pm, Pc) \quad (6A); \text{ and}$$

$$PsR = h(PsF) \quad (6B)$$

where max ( ) is the functional operator for selecting the higher one of the values inside the parentheses; and h ( ) is the functional operator for calculating the rear-wheel brake fluid pressure based on the front-wheel brake fluid pressure in such a manner as to achieve an optimal front-rear braking force distribution.

Then, vehicle status control unit 8 considers separately the cases depending on the magnitude relationship between the target front-wheel brake fluid pressure PsF and half the target front-wheel differential braking force ΔPrF/2 and the magnitude relationship between the target rear-wheel brake fluid pressure PsR and half the target rear-wheel differential braking force ΔPrR/2, in order to determine the target front-left-, front-right-, rear-left- and rear-right-wheel brake fluid pressures Psfl, Psfr, Psrl and Psrr.

If PsF>ΔPrF/2 and Psr>ΔPrR/2, vehicle status control unit 8 determines target front-left-, front-right-, rear-left- and rear-right-wheel brake fluid pressures Psfl, Psfr, Psrl and Psrr according to the following expressions (7A), (7B), (7C) and (7D), respectively:

$$Psfl=PsF-\Delta PrF/2 \quad (7A);$$

$$Psfr=PsF+\Delta PrF/2 \quad (7B);$$

$$Psrl=PsR-\Delta PrR/2 \quad (7C); \text{ and}$$

$$Psrr=PsR+\Delta PrR/2 \quad (7D).$$

In this way, the target front-left-, front-right-, rear-left- and rear-right-wheel brake fluid pressures Psfl, Psfr, Psrl and Psrr are determined by adding and subtracting half the target front-wheel differential braking force ΔPrF/2 and half the target rear-wheel differential braking force ΔPrR/2 to and from the target front-wheel brake fluid pressure PsF and the target rear-wheel brake fluid pressure PsR, respectively, so as to achieve both of the target deceleration Xgs and the target differential braking force ΔPr.

If PsF≦ΔPrF/2 and Psr≦ΔPrR/2, vehicle status control unit 8 determines target front-left-, front-right-, rear-left- and rear-right-wheel brake fluid pressures Psfl, Psfr, Psrl and Psrr according to the following expressions (8A), (8B), (8C) and (8D), respectively:

$$Psfl=0 \quad (8A);$$

$$Psfr=2\times PsF \quad (8B);$$

$$Psrl=0 \quad (8C); \text{ and}$$

$$Psrr=2\times PsR \quad (8D).$$

In this case, the target front-left-, front-right-, rear-left- and rear-right-wheel brake fluid pressures Psfl, Psfr, Psrl and Psrr are determined so as to achieve the target deceleration Xgs preferentially while achieving the target differential braking force ΔPr to the greatest extent practicable.

Similarly, vehicle status control unit 8 determines target front-left-, front-right-, rear-left- and rear-right-wheel brake fluid pressures Psfl, Psfr, Psrl and Psrr according to the above expressions (7A), (7B), (7C) and (7D), respectively, if PsF>ΔPrF/2 or PsR>ΔPrR/2. Vehicle status control unit 8 determines target front-left-, front-right-, rear-left- and rear-right-wheel brake fluid pressures Psfl, Psfr, Psrl and Psrr according to the above expressions (8A), (8B), (8C) and (8D), respectively, if PsF≦ΔPrF/2 or PsR≦ΔPrR/2.

Although the target deceleration Xgs is preferentially achieved in the first embodiment, the target differential braking force ΔPr may alternatively be achieved in preference. It may be possible to change which of the target deceleration Xgs and the target differential braking force ΔPr is achieved preferentially in accordance with the traveling state of the vehicle.

At step S11, vehicle status control unit 8 calculates a target driving torque Trq. More specifically, vehicle status control unit 8 considers separately the cases where the deceleration control is performed or not, and then, calculates the target driving torque Trq by an accelerator function f(Acc) depending on the cases. The accelerator function f(Acc) is herein derived to give a driving torque value responsive to the accelerator opening Acc. In the case where the deceleration control is performed, the target driving torque is given by Trq=f(0) in order to limit engine power and prevent the vehicle from acceleration even under driver's accelerator pedal operation. In the case where the deceleration control is not performed, the target driving torque is given by Trq=f(Acc). The calculation method of the target driving torque Trq is not limited to the above. As the target driving torque Trq is not necessarily set to a value responsive to no accelerator opening (Acc=0) at the start of deceleration control, the setting of the target driving torque Trq may be deferred.

At step S12, vehicle status control unit 8 generates and outputs control signals to brake fluid control circuit 7 and driving torque control circuit 12 so as to achieve the target brake fluid pressures Psfl, Psfr, Psrl and Psrr and the target driving torque Trq, respectively.

Further, vehicle status control unit 8 actuates warning unit 23 to produce a display or voice warning at the start of deceleration control.

After the completion of steps S1 to S12 shown in the flowchart of FIG. 2, control exits from the timer interruption and returns to the main program.

The vehicle status is controlled as follows in the first embodiment.

When the vehicle is traveling on a straight road, the vehicle yaw rate φs is relatively low (step S5) and the target vehicle speed Vs is relatively high. The target deceleration Xgs becomes lower than or equal to zero (step S7). The deceleration control is not thus performed. Under no deceleration control, the vehicle behavior change Δφe, the target differential braking force ΔPr, the target front- and rear-wheel differential braking force ΔPrF and ΔPrR are substantially zero (steps S8 and S9). The target brake fluid pressure Pc is also substantially zero (step S10) under no deceleration control. The target front- and rear-wheel brake fluid pressures PsF and PsR and the target front-left-, front-right-, rear-left- and rear-right-wheel brake fluid pressures Psfl, Psfr, Psrl and Psrr are set to values responsive to the master cylinder pressure Pm (step S10). Further, the target driving torque Trq is set to a value responsive to the accelerator opening Acc (step S11) under no deceleration control. The vehicle therefore shows behavior responsive to driver's accelerator pedal and brake pedal operations in the straight-traveling state.

When the vehicle subsequently comes into a curved road, the target vehicle speed Vs decreases with an increase in the vehicle yaw rate φs.

If the actual vehicle speed V is lower than the target vehicle speed Vs in this turning state (i.e. if the vehicle speed V is low enough for stable turning), the target deceleration Xgs becomes lower than or equal to zero (step S7). The deceleration control is not thus performed.

If the actual vehicle speed V is higher than the target vehicle speed Vs in the turning state, by contrast, the target deceleration Xgs becomes higher than zero (step S7) for vehicle safe traveling. The deceleration control is thus performed. The vehicle turning behavior change Δφe is estimated (step S8) based on the current actual lateral acceleration Yg and the target deceleration Xgs with reference to the control map of FIG. 4. The target differential braking force ΔPr is determined (step S9) as a braking force differential between inner and outer turning wheels 5FL, 5FR, 5RL and 5RR required to suppress the estimated vehicle behavior change Δφe. The target brake fluid pressure Pc is set (step S10) so as to attain the target deceleration Xgs, and then, the target front-left-, front-right-, rear-left- and rear-right-wheel brake fluid pressures Psfl, Psfr, Psrl and Psrr are set so as to attain the target deceleration Xgs preferentially over the target differential braking force ΔPr (step S10). Further, the target driving torque Trq is set to the value responsive to no accelerator opening Acc=0 (step S11) irrespective of driver's accelerator pedal operation. The vehicle is therefore decelerated at the desired target deceleration rate Xgs and prevented from understeer under the deceleration control during vehicle turning.

The effects of the deceleration control in the first embodiment will be explained below with reference to FIGS. 5A and 5B. By way of example, the following explanation refers to the case where the vehicle makes a left turn. It is needless to say that the same goes for the case where the vehicle makes a right turn.

Figure 5A:
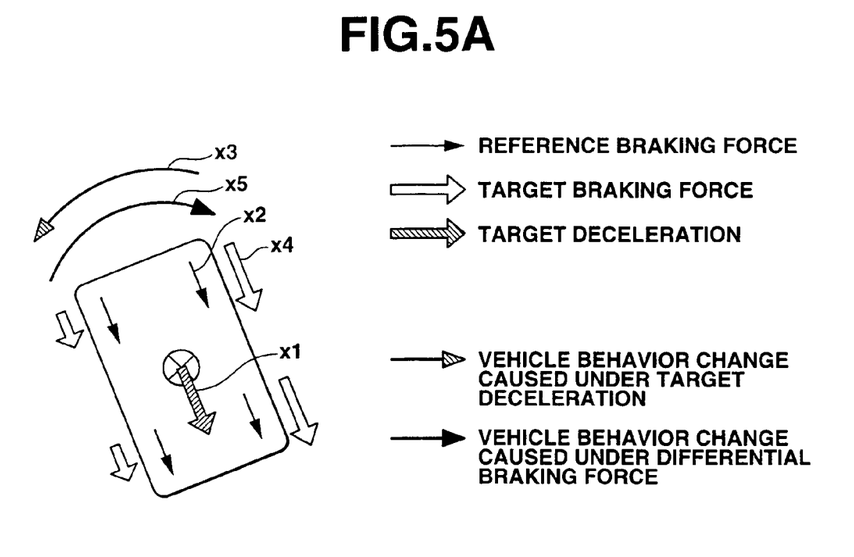
FIGS. 5A and 5B are schematic illustrations showing vehicle behavior during deceleration control according to the first embodiment of the invention.

There arises a change in vehicle behavior (indicated by arrow x3), as illustrated in FIG. 5A, when each of vehicle wheels 5FL, 5FR, 5RL and 5RR experiences a reference target braking force corresponding to the target brake fluid pressure Pc (indicated by arrows x2) so as to attain the target deceleration Xgs (indicated by arrow x1) during vehicle turning.

Figure 5B:
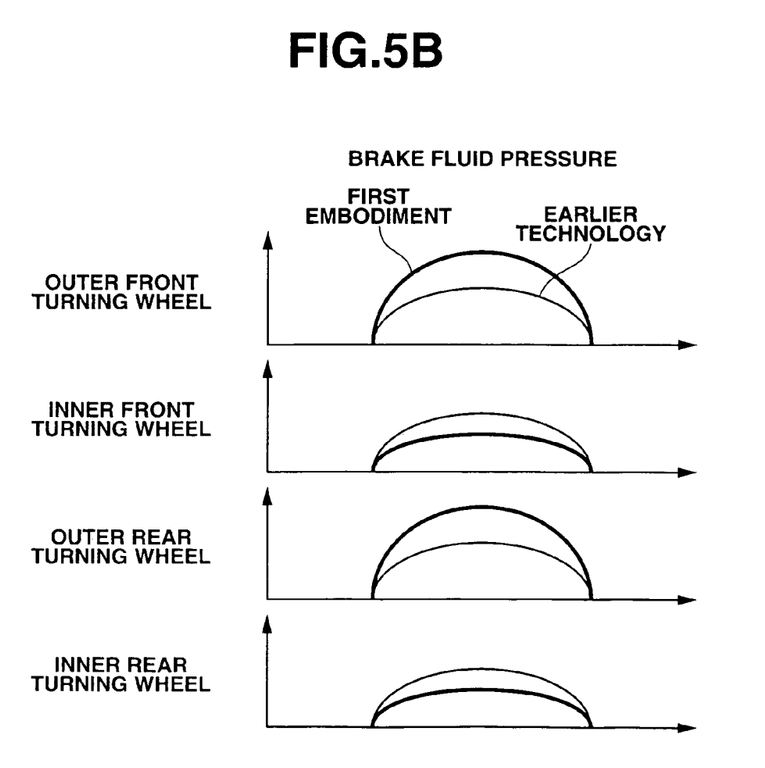

It has been common practice in the earlier technology to regulate the brake fluid pressures of inner and outer front turning wheels equally and to regulate the brake fluid pressures of inner and outer rear turning wheels equally, as indicated by thin lines of FIG. 5B, during the deceleration control.

On the other hand, the brake fluid pressures of vehicle wheels 5FL, 5FR, 5RL and 5RR are regulated in the first embodiment in such a manner that the brake fluid pressures of outer turning wheels (i.e. front- and rear-right wheels 5FR and 5RR in this case) become higher than the brake fluid pressures of inner turning wheels (i.e. front- and rear-left wheels 5FL and 5RL in this case) as indicated by arrows x4 of FIG. 5A and by heavy lines of FIG. 5B. Through such brake fluid pressure regulation, the differential braking force $\Delta Pr$ is developed to cause a change in vehicle behavior (indicated by arrow x5) that cancels out the vehicle behavior change (indicated by arrow x3) occurring under the target deceleration Xgs.

Accordingly, there is a possibility that the vehicle behavior change $\Delta \phi e$ may occur under the deceleration control during vehicle turning. In the first embodiment, however, the differential braking pressure $\Delta Pr$ is applied to cancel out and suppress such a vehicle behavior change $\Delta \phi e$. This makes it possible to decelerate the vehicle, before the vehicle changes its turning behavior, under the deceleration control and to secure stable vehicle turning behavior without driver discomfort. Under the deceleration control, the target vehicle speed Vs is determined based on the road friction coefficient K$\mu$, the yaw rate $\phi$s and the lateral acceleration limit Yglimt, and then, the target deceleration Xgs is determined based on the target vehicle speed Vs. Further, the differential braking force $\Delta Pr$ is applied between inner and outer turning wheels i.e. between front-left wheel 5FL and front-right wheel 5FR and between rear-left wheel 5RL and rear-right wheel 5RR with respect to the reference target braking force. This makes it possible to maintain a turning radius of the vehicle as expected by the driver and prevent the vehicle from changing in behavior more assuredly through appropriate deceleration control.

Although the target deceleration Xgs is achieved by braking force control in the first embodiment, it may alternatively be possible to achieve the target deceleration Xgs by braking force control and by driving force control upon correction of the target brake fluid pressure Pc in view of the deceleration caused by e.g. controlling throttle valve 11 to a totally closed position. Further, the method of braking force control is not limited to brake fluid pressure regulation. If the vehicle has a motor capable of controlling the driving torque on each vehicle wheel 5FL, 5FR, 5RL, 5RR appropriately, the driving toque on each vehicle wheel 5FL, 5FR, 5RL, 5RR can alternatively be adjusted with the use of such a motor.

It should be noted that, in the first embodiment, the processes of steps S4-S7 and S10-S12 correspond to a deceleration control block, the process of step S8 corresponds to a vehicle behavior change estimation block, and the processes of steps S9 and S10 correspond to a vehicle behavior change suppression block.

Next, the second embodiment will be explained below with reference to FIGS. 6 to 8. The second embodiment is similar to the first embodiment, except for the configuration of brake fluid pressure control circuit 7 and the control processes of vehicle status control unit 8.

In the second embodiment, brake fluid pressure control circuit 7 is designed as a low-priced brake fluid control circuit. For example, brake fluid pressure control circuit 7 may be designed for ABS control so as to apply brake fluid pressures to respective wheel cylinders 6FL, 6FR, 6RL and 6RR of vehicle wheels 5FL, 5FR, 5RL and 5RR and defer such brake fluid pressure application at each vehicle wheel 5FL, 5FR, 5RL, 5RR by means of e.g. an ABS control valve, i.e., to drive the control valve in such a manner as to create an auxiliary brake fluid pressure control state for increases in the brake fluid pressures. In this case, brake fluid pressure control circuit 7 cannot regulate the brake fluid pressures of vehicle wheels 5FL, 5FR, 5RL and 5RR individually. The deceleration control is thus performed by a simple control procedure in the second embodiment.

Figure 6:
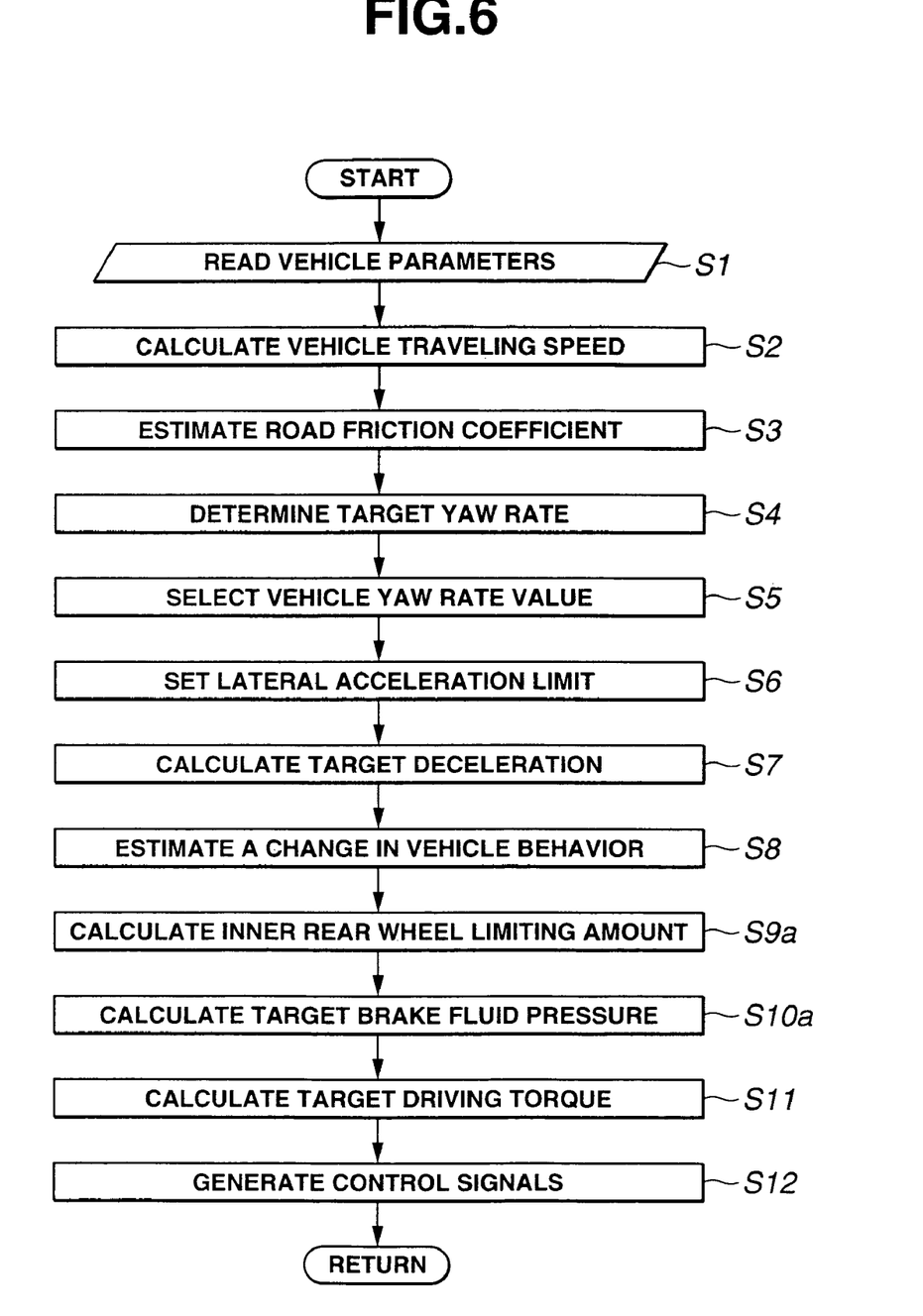
FIG. 6 is a flow chart for a control program executed by a vehicle deceleration control apparatus according to a second embodiment of the invention.

As shown in FIG. 6, vehicle status control unit 8 executes the following control program in the second embodiment. Herein, steps 1 to 8 are common to the first and second embodiment.

After determining a target deceleration Xgs at step S7 and estimating a vehicle turning behavior change $\Delta \phi e$ occurring under the target deceleration Xgs at step S8, vehicle status control unit 8 calculates at step S9a an inner-rear-wheel limiting amount Pinlimit, by which the braking force on inner rear turning wheel 5RL or 5RR is limited to suppress the estimated vehicle behavior change $\Delta \phi e$, according to the following expression (9):

$$Pinlimit = Kb2 \times \Delta \phi e \qquad (9)$$

where Kb2 is a conversion factor for converting the vehicle behavior change into the inner-rear-wheel limiting amount.

The conversion factor Kb2 is a constant determined according to vehicle specifications including brake specifications (such as vehicle yaw inertia and tread).

The wheel limiting amount Pinlimt is herein applied only to inner rear wheel 5RL or 5RR. As that there is a restriction on the wheel control amount per control cycle, the wheel limiting amount Pinlimt is achieved during several control cycles. Limiting inner rear wheel 5RL or 5RR is particularly effective in improving vehicle turning stability, thereby allowing efficient vehicle behavior control even by the use of a low-priced actuator that has a low degree of control flexibility.

Then, vehicle status control unit 8 determines at step S10a target brake fluid pressures Psfl, Psfr, Psrl and Psrr supplied to wheel cylinders 6FL, 6FR, 6RL and 6RR of vehicle wheels 5FL, 5FR, 5RL and 5RR, respectively, by the following procedure.

First, vehicle status control unit 8 calculates a reference target brake fluid pressure Pc from the target deceleration Xgs according to the above expression (5). Next, vehicle status control unit 8 calculates reference target front- and rear-wheel brake fluid pressure PsF and PsR from the target brake fluid pressure Pc according to the above expressions (6A) and (6B), respectively, in view of the master cylinder pressure Pm developed in response to driver's brake pedal operation.

Then, vehicle status control unit 8 considers separately the cases depending on the magnitude relationship between the target rear-wheel brake fluid pressure PsR and the after-mentioned remaining inner-rear-wheel limiting amount Zpinlimt, in order to determine the target front-left-, front-right-, rear-left- and rear-right-wheel brake fluid pressures Psfl, Psfr, Psrl and Psrr. By way of example, the following explanation refers to the case where the vehicle makes a left turn. It is needless to say that the same goes for the case where the vehicle makes a right turn.

If PsR≦Zpinlimt, vehicle status control unit 8 determines the target front-left-, front-right-, rear-left- and rear-right-wheel brake fluid pressures Psfl, Psfr, Psrl and Psrr according to the following expressions (10A), (10B), (10C) and (10D), respectively:

$$Psfl=PsF \tag{10A};$$

$$Psfr=PsF \tag{10B};$$

$$Psrl=0 \tag{10C}; \text{ and}$$

$$Psrr=PsR \tag{10D}.$$

If PsR>Zpinlimt, vehicle status control unit 8 determines the target front-left-, front-right-, rear-left- and rear-right-wheel brake fluid pressures Psfl, Psfr, Psrl and Psrr according to the following expressions (11A), (11B), (11C) and (11D), respectively:

$$Psfl=PsF \tag{11A};$$

$$Psfr=PsF \tag{11B};$$

$$Psrl=PsR-ZPinlimt \tag{11C}; \text{ and}$$

$$Psrr=PsR \tag{11D}.$$

The remaining wheel limiting amount ZPinlimt is herein defined, by the following expression (12), as an inner-rear-wheel limiting amount remaining in the present control cycle:

$$ZPinlimt=\max [Pinlimt(n), \{Pinlimt(n-1)-PsR(n-1)\}] \tag{12}$$

where max[] is the functional operator for selecting the higher one of the variables inside the parentheses.

Namely, the remaining wheel limiting amount ZPinlimt is selected as the greater value of the wheel limiting amount Pinlimt(n) calculated in the current control cycle and the difference between the wheel limiting amount Pinlimt(n−1) calculated in the previous control cycle and the target brake fluid pressure PsR(n−1) determined corresponding to the decrease of brake fluid pressure in the previous control cycle.

After determining the target front-left-, front-right-, rear-left- and rear-right-wheel brake fluid pressures Psfl, Psfr, Psrl and Psrr at step S10a, vehicle status control unit 8 calculates at step S11 a target driving torque Trq and generates at step S12 control signals to brake fluid control circuit 7 and driving torque control circuit 12 so as to achieve the target brake fluid pressures Psfl, Psfr, Psrl and Psrr and the target driving torque Trq, respectively, in the same manner as in the first embodiment.

The vehicle status is controlled as follows in the second embodiment. When the vehicle comes into a curved road, the vehicle speed V decreases with increase in the yaw rate φs.

If the actual vehicle speed V is higher than the target vehicle speed Vs, the target deceleration Xgs becomes higher than zero (step S7). The deceleration control is thus performed. The vehicle turning behavior change Δφe is estimated (step S8) based on the current actual lateral acceleration Yg and the target deceleration Xgs with reference to the control map of FIG. 4. Then, the wheel limiting amount is calculated (step S9a). The target brake fluid pressure Pc is set so as to attain the target deceleration Xgs, and then, the target front-left-, front-right-, rear-left- and rear-right-wheel brake fluid pressures Psfl, Psfr, Psrl and Psrr so as to limit the braking force on inner rear wheel (i.e. rear-left wheel 5RR in this case) by the wheel limiting amount Pinlmt (step S10a) and thereby suppress the estimated vehicle behavior change Δφe while attaining the target deceleration Xgs. Further, the target driving torque Trq is set to a value responsive to no accelerator opening Acc=0 (step S11) irrespective of driver's accelerator pedal operation. The vehicle is therefore decelerated at the desired target deceleration rate Xgs and prevented from understeer under the deceleration control during vehicle turning.

The effects of the deceleration control in the second embodiment will be explained with reference to FIGS. 7A, 7B and 8.

Figure 7A:
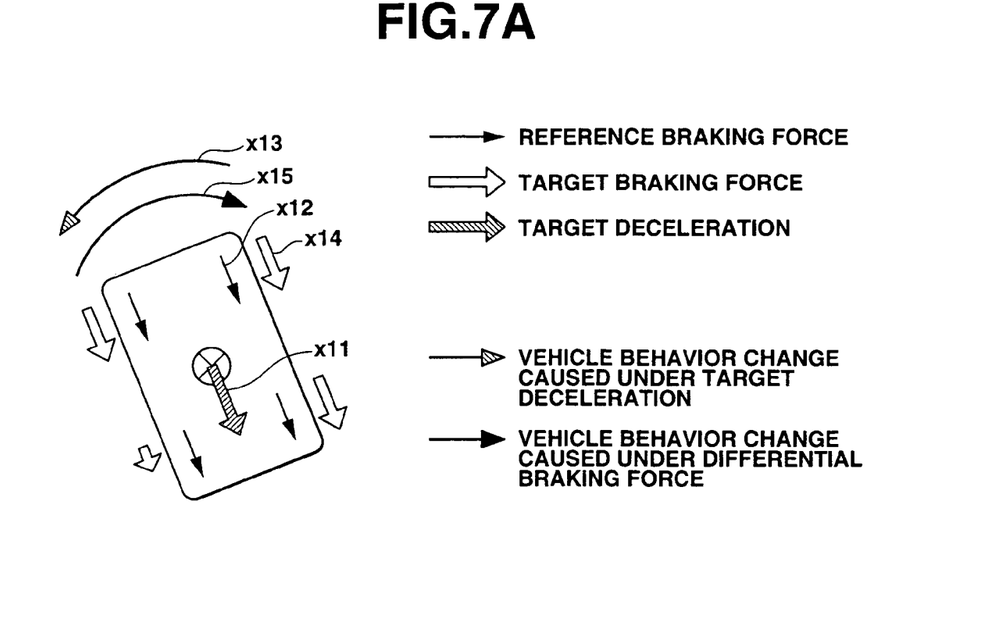
FIGS. 7A and 7B are schematic illustrations showing vehicle behavior during deceleration control according to the second embodiment of the invention.

There arises a change in vehicle behavior (indicated by arrow x13), as illustrated in FIG. 7A, when each of vehicle wheels 5FL, 5FR, 5RL and 5RR experiences as a reference target braking force corresponding to the target brake fluid pressure Pc (indicated by arrows x12) so as to attain the target deceleration Xgs (indicated by arrow x11) during vehicle turning.

Figure 7B:
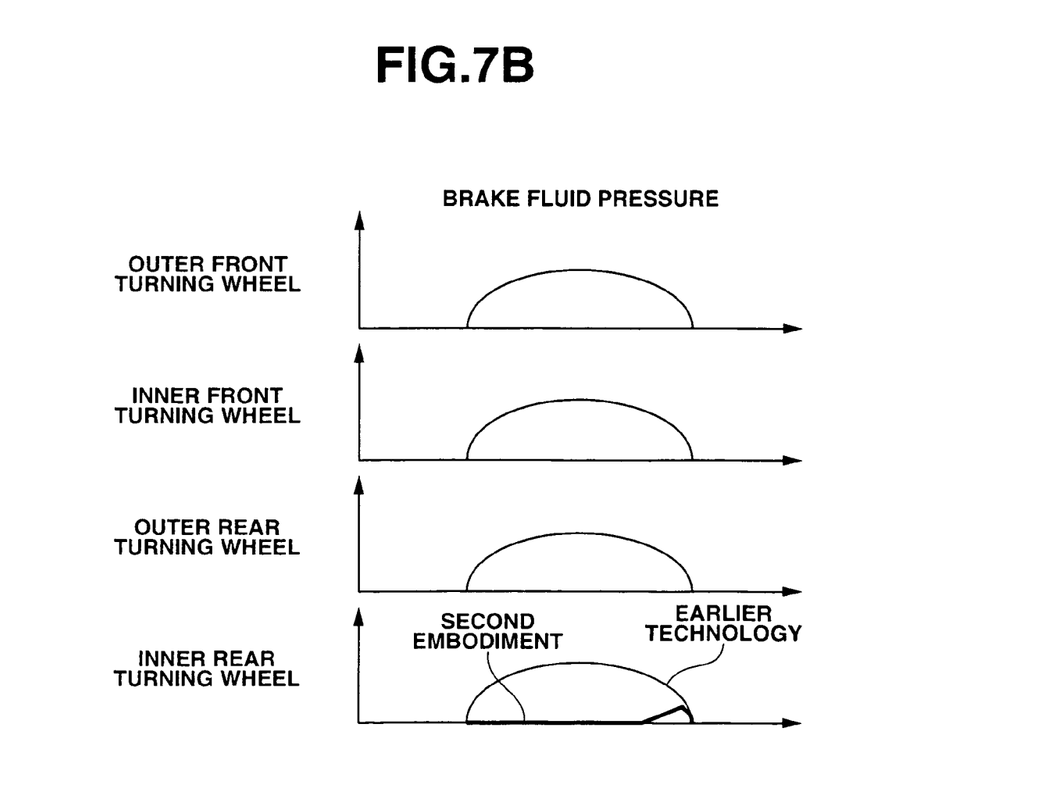

It has been common practice in the earlier technology to regulate the brake fluid pressures of inner and outer front turning wheels equally and to regulate the brake fluid pressures of inner and outer rear turning wheels equally as indicated by thin lines of FIG. 7B.

In the second embodiment, however, the brake fluid pressures of vehicle wheels 5FL, 5FR, 5RL and 5RR are regulated in such a manner as to reduce the braking force on inner rear turning wheel (i.e. rear-left wheel 5RL in this case) by the wheel limiting amount Pinlimt, as indicated by arrows x14 of FIG. 7A, during the deceleration control. The wheel limiting amount Pinlimt is large in the initial stage of vehicle turning. While the remaining wheel limiting amount ZPinlimt is larger than or equal to the target brake fluid pressure PsR, the target inner-rear-wheel brake fluid pressure (i.e. the target rear-left-wheel brake fluid pressure Psrl in this case) is then controlled to zero as indicated by a heavy line of FIG. 7B. In the final stage of turning, the target brake fluid pressure PsR decreases with the wheel limiting amount Pinlmt under the effects of the deceleration control. When the remaining wheel limiting amount ZPinlimt becomes smaller than the target brake fluid pressure PsR, the target inner-rear-wheel brake fluid pressure (the target rear-left-wheel brake fluid pressure Psrl) is increased as indicated by the heavy line of FIG. 7B. There thus arises a change in vehicle behavior (indicated by arrow x15) that cancels out the vehicle behavior change (indicated by arrow x13) occurring under the target deceleration Xgs. When the vehicle behavior change Δφe gets substantially zero at the completion of vehicle turning, both the wheel limiting amount Pinlmt and the remaining wheel limiting amount ZPinlmt become zero. In this state, the braking force corresponding to the target brake fluid pressure PsF, PsR is exerted on each vehicle wheel 5FL, 5FR, 5RL, 5RR.

Figure 8:
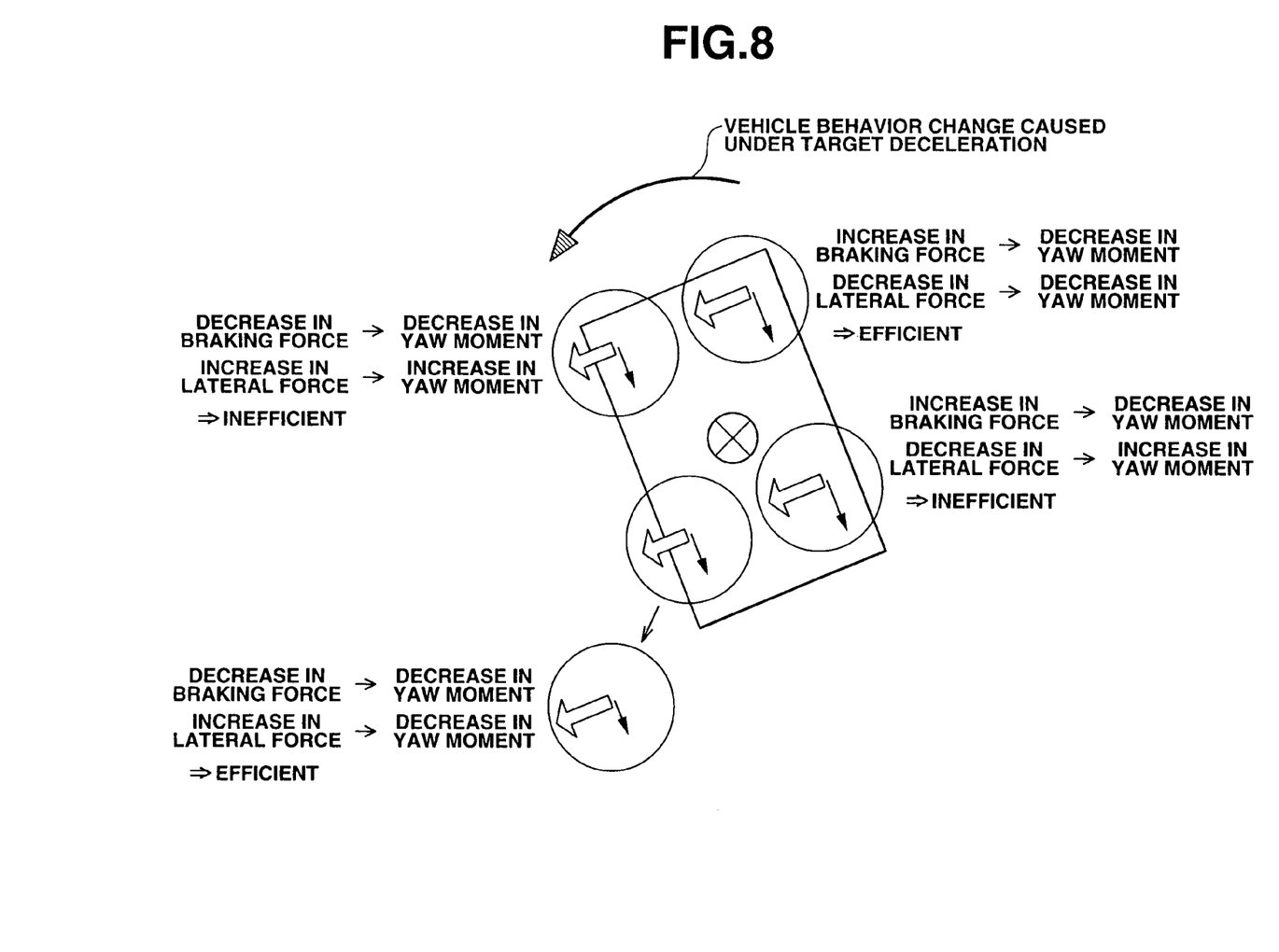
FIG. 8 is a schematic illustration showing a friction circle on each tire.

As illustrated in FIG. 8, the yaw moment is produced on the vehicle in a vehicle turning direction. When the braking force on outer front turning wheel (i.e. front-right wheel 5FR in this case) increases so as to reduce the yaw moment, the lateral force on outer front turning wheel 5FR becomes decreased.

Both of the increase in braking force on outer front wheel 5FR and the decrease in lateral force on outer front wheel 5FR cause a decrease in yaw moment efficiently. When the braking force on outer rear turning wheel (i.e. rear-right wheel 5RR in this case) increases to reduce the yaw moment, the lateral force on outer rear turning wheel 5RR becomes decreased. The increase in braking force on outer rear turning wheel 5RR causes a decrease in yaw moment, but the decrease in lateral force on outer rear turning wheel 5RR causes an increase in yaw moment. Thus, the control of the braking force and the lateral force on outer rear wheel 5RR results in an inefficient reduction of the yaw moment. When the braking force on inner front turning wheel (i.e. front-left wheel 5FL in this case) decrease to reduce the yaw moment, the lateral force on inner front turning wheel 5FL becomes increased. The increase in braking force on inner front turning wheel 5FL causes a decrease in yaw moment, but the decrease in lateral force on inner front turning wheel 5FR causes an increase in yaw moment. The control of the braking force and the lateral force on inner front wheel 5FL also results in an inefficient reduction of the yaw moment. When the braking force on inner rear turning wheel (i.e. rear-left wheel 5RL in this case) increases to reduce the yaw moment, the lateral force on inner rear turning wheel 5RL becomes decreased. Both of the increase in braking force on inner rear wheel 5RL and the decrease in lateral force on inner rear wheel 5RL cause a decrease in yaw moment efficiently. The yaw moment of the vehicle can be therefore reduced efficiently by increasing the braking force on outer front wheel or by decreasing the braking force on inner rear wheel. In the case of using a low-priced actuator in the braking unit, it is difficult to increase the brake fluid pressure on only one of vehicle wheels. The decrease of the brake fluid pressure of inner rear wheel would be the best-suited efficient way to reduce the vehicle yaw moment and suppress the vehicle behavior change $\Delta\phi e$.

As described above, the braking force on inner rear turning wheel 5RL or 5RR is limited to cancel out and suppress the vehicle turning behavior change $\Delta\phi e$ under the deceleration control in the second embodiment. It is thus possible in the second embodiment to decelerate the vehicle, before the vehicle changes its turning behavior, under the deceleration control, secure stable vehicle turning behavior without driver discomfort and obtain the same effects as obtained in the first embodiment. Further, the vehicle behavior change $\Delta\phi e$ is suppressed efficiently just by decreasing the brake braking force on inner rear turning wheel 5RL or 5RR. This allows appropriate deceleration control for stable vehicle turning behavior even in the case where the braking unit is not designed to regulate the brake fluid pressures of vehicle wheels 5FL, 5FR, 5RL and 5RR individually but has a low-priced, low-control-flexibility actuator capable of decreasing the brake fluid pressure of inner rear turning wheel 5RL or 5RR.

It should be noted that, in the second embodiment, the processes of steps S4-S7, S10a and S11-S12 correspond to a deceleration control block, the process of step S8 corresponds to a vehicle behavior change estimation block, and the processes of step S9a and S10a correspond to a vehicle behavior change suppression block.

Finally, the third embodiment will be explained below with reference to FIG. 9. The third embodiment is similar to the second embodiment, except for the control processes of vehicle status control unit 8. More especially, the deceleration control is automatically performed to avoid a collision of the host vehicle with any obstacle ahead of the host vehicle, such as the preceding vehicle, or decrease a collision speed between the host vehicle and the obstacle in the third embodiment. The deceleration control is not necessarily effected during vehicle turning but may be effected during vehicle straight traveling. Depending on the traveling state of the vehicle, there may be a case that the brake fluid pressures in respective wheel cylinders 6FL, 6FR, 6RL and 6RR of vehicle wheels 5FL, 5FR, 5RL and 5RR do not change. In the third embodiment, the effects of the deceleration control can be thus maximized especially when the automatic deceleration control is performed during vehicle turning.

Figure 9:
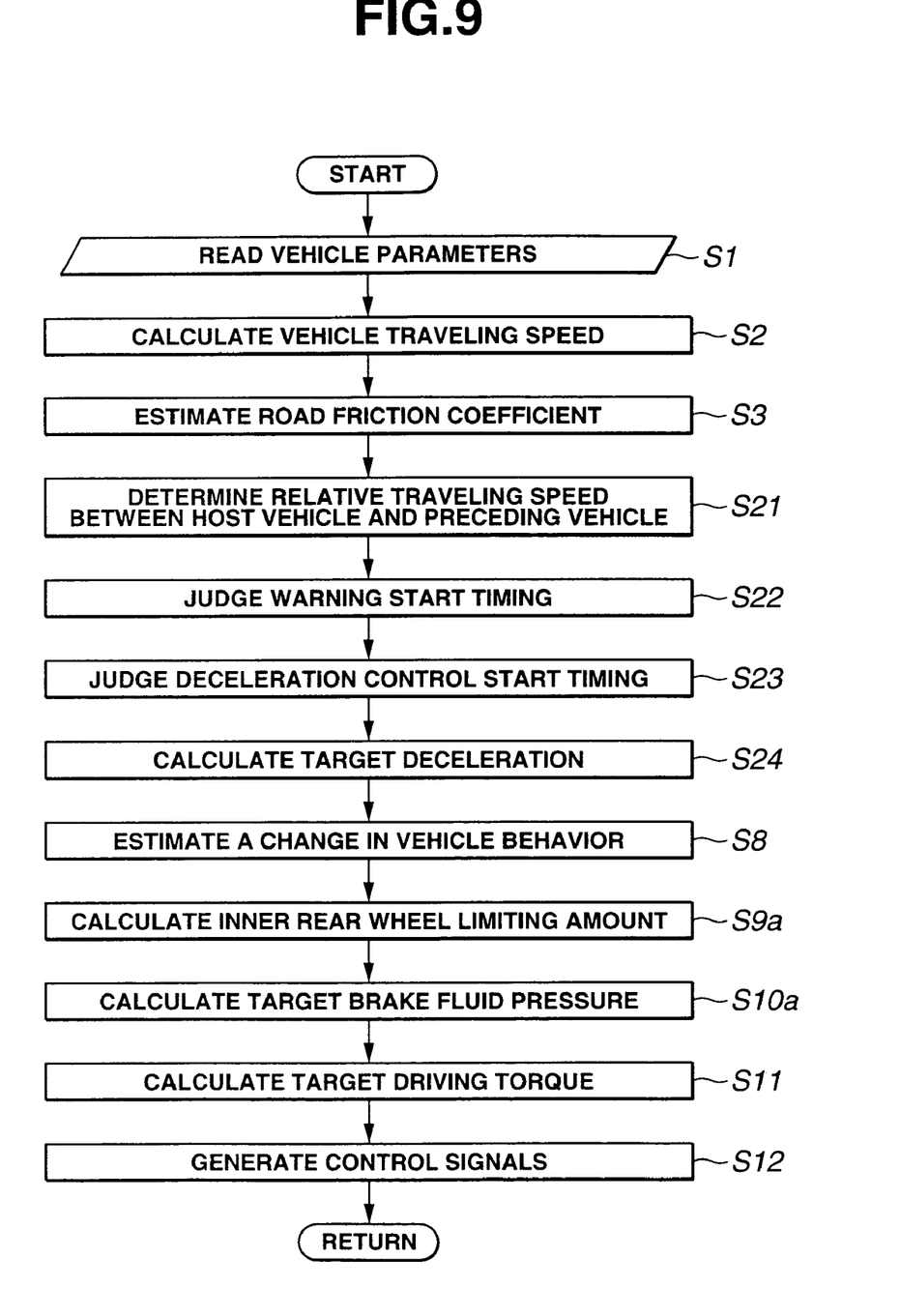
FIG. 9 is a flowchart for a control program executed by a vehicle deceleration control apparatus according to a third embodiment of the invention.

As shown in FIG. 9, vehicle status control unit 8 executes the following control program in the third embodiment. Herein, steps S1 to S3 are common to the second and third embodiments.

After obtaining the estimated road friction coefficient $K\mu$ at step S3, vehicle status control unit 8 calculates at step S21 a relative speed dLx between the host vehicle and the preceding vehicle based on the detection results of inter-vehicle distance sensor 13 and inter-vehicle distance controller 14. In the third embodiment, the relative vehicle speed dLx is calculated by subtracting the previous inter-vehicle distance Lx(n−1) from the current inter-vehicle distance Lx(n). It is defined that only the preceding vehicle which the host vehicle is approaching is regarded as a subject of control and that the inter-vehicle distance Lx becomes a negative value at the time the host vehicle is approaching the preceding vehicle.

Then, vehicle status control unit 8 decides at step S22 on whether to give a warning about the possibility that the host vehicle may collide with the preceding vehicle based on the positional relationship between the host vehicle and the preceding vehicle by the following procedure.

Vehicle status control unit 8 first judges whether the host vehicle and the preceding vehicle are traveling in the same lane. In the third embodiment, the judgment of whether the host vehicle and the preceding vehicle are in the same lane is made by a known method based on the longitudinal and lateral components Lx and Ly of the inter-vehicle distance from the host vehicle to the preceding vehicle, the steering angle $\theta$ and the host vehicle speed V.

If the host vehicle and the preceding vehicle are judged as being in the same lane, vehicle status control unit 8 calculates a collision index As according to the following expressions (13) and (14):

$$As = Kap \times (Lx - Lc) + Kad \times dLx \quad (13); \text{ and}$$

$$Lc = Lv1 \times V + Lv2 \quad (14)$$

where V is the vehicle speed determined at step S2; Lc is the reference value of the inter-vehicle distance; Lx is the inter-vehicle distance between the host vehicle and the preceding vehicle; dLx is the relative vehicle speed determined at step S21; Kap and Kad are the weighting factors; and Lv1 and Lv2 are the coefficients for calculation of the reference inter-vehicle distance value.

When the collision index As is smaller than a threshold Aw, vehicle status control unit 8 decides on the actuation of warning unit 23 so as to start warning of the possibility of the collision between the host vehicle and the preceding vehicle, and then, set a warning start flag Fw to the ON position. On the other hand, vehicle status control unit 8 decides on the cancellation of warning of the collision possibility and sets the warning start flag Fw to the OFF position when the collision index As is larger than or equal to the threshold Aw.

Upon setting of the warning start flag Fw to the ON position, vehicle status control unit 8 decides on at step S23 whether to start the deceleration control.

More specifically, vehicle status control unit 8 calculates a deceleration control start index TCC according to the following expression (15):

$$TTC = Lx/dLx \tag{15}$$

where Lx is the inter-vehicle distance between the host vehicle and the preceding vehicle; and dLx is the relative vehicle speed.

When the deceleration control start index TCC is smaller than a threshold TTC0, vehicle status control unit 8 decides on the starting of the deceleration control, and then, sets a deceleration control start flag Fc to the ON position. When the deceleration control start index TCC is larger than or equal to zero, vehicle status control unit 8 decides on the cancellation of the deceleration control and sets the deceleration control start flag Fc to the OFF position. The threshold FCC0 may be set to a fixed value of e.g. approximately 1.5 sec, or may be changed in accordance with the vehicle speed V.

Then, vehicle status control unit 8 calculates at step S24 a target deceleration Xgs according to the following expression (16):

$$Xgs = Kxg \times (TTC0 - TTC) \tag{16}$$

where TTC is the deceleration control index; TCC0 is the deceleration control index threshold; and Kxg is the control gain.

The control gain Kx is set to a fixed value in the third embodiment, but may alternatively be changed in accordance with the vehicle speed V.

After calculating the target deceleration Xgs at step 24, vehicle status control unit 8 estimates a vehicle behavior change $\Delta\phi e$ that can be caused under the deceleration control at step S8, calculates an inner-rear-wheel limiting amount Pinlimit at step S9a, determines target brake fluid pressures Psfl, Psfr, Psrl and Psrr supplied to wheel cylinders 6FL, 6FR, 6RL and 6RR of vehicle wheels 5FL, 5FR, 5RL and 5RR at step S10a, calculates a target driving torque Trq at step S11, and then, generates at step S12 control signals to brake fluid control circuit 7 and driving torque control circuit 12 so as to achieve the target brake fluid pressures Psfl, Psfr, Psrl and Psrr and the target driving torque Trq, respectively, in the same manner as in the second embodiment.

The braking force on inner rear turning wheel 5RL or 5RR is also limited, as explained above, to cancel out and suppress the vehicle turning behavior change $\Delta\phi e$ under the deceleration control in the third embodiment. It is thus possible in the third embodiment to decelerate the vehicle before the vehicle changes its turning behavior under the deceleration control, secure stable vehicle turning behavior without driver discomfort while avoiding the collision between the host vehicle and the preceding vehicle and obtain the same effects as obtained in the second embodiment. The above-explained collision avoidance technique of the third embodiment can be applied not only to the second embodiment but also to the first embodiment.

It should be noted that, in the third embodiment, the processes of steps S21-S24, S10a and S11-S12 correspond to a deceleration control block, the processes of step S21-S23 corresponds to an obstacle detection block, the process of step S8 corresponds to a vehicle behavior change estimation block, and the processes of step S9a and S10a correspond to a vehicle behavior change suppression block.

In the above description, the first and second embodiments has been directed to deceleration control apparatuses intended for the prevention of understeer during vehicle turning, and the third embodiment has been directed to an automatic deceleration control apparatus intended for the prevention of a collision between the host vehicle and the obstacle. However, the first, second and third embodiments are not limited to the above. For example, vehicle status control unit 8 may be programmed to, e.g. at step S7 or S24, acquire information about the shape of a curved road ahead of the vehicle from a navigation system etc., determine the target vehicle speed Vs suitable for traveling on such a curved road based on the acquired information and calculate the target deceleration Xgs from the target vehicle speed Vs, in order to reduce the actual vehicle speed V to the target vehicle speed Vs before the vehicle comes into the curved road. Vehicle status control unit 8 may be programmed to judge a tendency of the vehicle to deviate from a traveling lane and, if the vehicle is judged as deviating from the traveling lane and control the target deceleration Xg according to the judged vehicle deviation tendency, in order to avoid the deviation of the vehicle from the traveling lane. Vehicle status control unit 8 may be programmed to communicate with an infrastructure system located near a traveling course of the vehicle so as to acquire information about a traveling environment of the vehicle, and then, control the target deceleration Xgs according to the acquired vehicle traveling environment information. To sum up, the present invention can be applied to any deceleration control apparatus that performs deceleration control regardless of a driver's intention in some case, thereby benefiting from the present invention, i.e., preventing the vehicle effectively from changing its turning behavior during the deceleration control and securing vehicle stable running with driver discomfort.

The entire contents of Japanese Patent Application No. 2004-128336 (filed on Apr. 23, 2004) are herein incorporated by reference.

Although the present invention has been described with reference to specific embodiments of the invention, the invention is not limited to the above-described embodiments. Various modification and variation of the embodiments described above will occur to those skilled in the art in light of the above teaching. The scope of the invention is defined with reference to the following claims.

What is claimed is:

1. A deceleration control apparatus for applying a braking force to cause deceleration of an automotive vehicle by regulating an individual brake fluid pressure on each vehicle wheel in accordance with a traveling state of the vehicle, comprising a control unit programmed to read an actual vehicle speed, a steering angle, a lateral acceleration and an actual yaw rate of the vehicle; calculate a target yaw rate from the actual vehicle speed and the steering angle; set a lateral acceleration limit of the vehicle; determine a target vehicle speed based on the lateral acceleration limit and a higher value of the actual yaw rate and the target yaw rate; calculate a target deceleration rate from the actual vehicle speed and the target vehicle speed; control vehicle deceleration according to the target deceleration rate; estimate, prior to causing said vehicle deceleration, a change in vehicle behavior according to the lateral acceleration and the calculated target deceleration rate of the vehicle and depending on a load shift that can occur under said deceleration; calculate a target braking force differential based on the estimated vehicle behavior change; and then, control a braking force differential applied between left and right wheels of the vehicle according to a reference braking force in accordance with the target braking force differential so as to suppress said estimated vehicle behavior change.

2. A deceleration control apparatus for an automotive vehicle, comprising a control unit, wherein the control unit comprises:

a deceleration control block that reads an actual vehicle speed, a steering angle, a lateral acceleration and an actual yaw rate of the vehicle, calculates a target yaw rate from the actual vehicle speed and the steering angle, sets a lateral acceleration limit of the vehicle, determines a target vehicle speed based on the lateral acceleration limit and a higher value of the actual yaw rate and the target yaw rate, calculates a target deceleration rate from the actual vehicle speed and the target vehicle speed and applies a reference braking force to cause deceleration of the vehicle in accordance with the target deceleration rate;

an estimation block that estimates, prior to causing the vehicle deceleration, a change in vehicle behavior according to the lateral acceleration and the calculated target deceleration rate of the vehicle and depending on a load shift that can be produced by causing the vehicle deceleration; and a suppression block that calculates a target braking force differential based on the estimated vehicle behavior change and controls a braking force differential applied between inner and outer wheels of the vehicle according to the reference braking force in accordance with the target braking force differential so as to suppress the estimated vehicle behavior change.

3. The deceleration control apparatus as defined in claim 2, wherein the suppression block limits a braking force on the inner rear wheel so as to suppress the estimated vehicle behavior change.

4. The deceleration control apparatus as defined in claim 2, wherein the deceleration control block controls the vehicle deceleration by causing at least one of a decrease in engine output, an increase in brake fluid pressure and a change in transmission gear ratio.

5. The deceleration control apparatus as defined in claim 2, wherein the deceleration control block obtains a friction coefficient of a road on which the vehicle is traveling to determine the target vehicle speed based on the lateral acceleration limit, the road friction coefficient, and the higher value of the read actual yaw rate and the calculated target yaw rate.

6. A deceleration control method for an automotive vehicle, comprising:

reading an actual vehicle speed, a steering angle, a lateral acceleration and an actual yaw rate of the vehicle;

calculating a target yaw rate from the actual vehicle speed and the steering angle;

setting a lateral acceleration limit of the vehicle;

determining a target vehicle speed based on the lateral acceleration limit and a higher value of the actual yaw rate and the target yaw rate;

calculating a target deceleration rate from the actual vehicle speed and the target vehicle speed;

prior to causing a vehicle deceleration, estimating a change, using a control unit, in vehicle behavior according to the lateral acceleration and the calculated target deceleration rate of the vehicle and depending on a load shift that can be produced by causing the vehicle deceleration;

calculating a target braking force differential based on the estimated vehicle behavior change;

applying a reference braking force to cause vehicle deceleration at a desired rate by regulating an individual brake fluid pressure on each vehicle wheel in accordance with the target deceleration rate; and applying a braking force differential between left and right wheels of the vehicle according to the reference braking force in accordance with the target braking force differential so as to suppress the estimated vehicle behavior change.

7. The deceleration control apparatus as defined in claim 2, wherein the deceleration control block regulates brake fluid pressures of the inner and outer vehicle wheels such that the brake fluid pressures of the outer vehicle wheels become higher than the brake fluid pressures of the inner vehicle wheels so as to apply the braking force differential between the inner and outer vehicle wheels and suppress the estimated vehicle behavior change.

8. The deceleration control apparatus as defined in claim 2, wherein the deceleration control block suppresses the estimated vehicle behavior change by performing an individual braking force control for each specific vehicle wheel.

* * * * *